(No Model.)

F. F. IDE.
BICYCLE CRANK.

No. 518,456. Patented Apr. 17, 1894.

WITNESSES:
Johna Bergstrom
C. Sedgwick

INVENTOR
F. F. Ide
BY
Munn & Co
ATTORNEYS.

UNITED STATES PATENT OFFICE.

FERDINAND F. IDE, OF PEORIA, ILLINOIS, ASSIGNOR TO THE F. F. IDE MANUFACTURING COMPANY, OF SAME PLACE.

BICYCLE-CRANK.

SPECIFICATION forming part of Letters Patent No. 518,456, dated April 17, 1894.

Application filed January 25, 1894. Serial No. 497,963. (No model.)

*To all whom it may concern:*

Be it known that I, FERDINAND F. IDE, of Peoria, in the county of Peoria and State of Illinois, have invented a new and Improved Bicycle-Crank, of which the following is a full, clear, and exact description.

My invention relates to improvements in cranks which are used as the pedal shafts of bicycles.

The object of my invention is to produce a spring crank which, when attached to a pedal shaft, will under ordinary circumstances act like the rigid crank commonly used, but which under heavy pressure will straighten out, thus increasing its length and giving additional leverage so that the rider's foot travels in an ellipse, and the increased leverage enables him to drive a machine easily up hill or over a bare road.

A further object of providing a spring crank is to produce a crank which will more quickly respond to the thrust of the rider's foot than will the ordinary rigid crank, also to provide a crank which will not transmit any perceptible jar to the rider, and further to produce a crank which will yield when the pedal strikes an obstruction and thus prevent any excessive shock from being imparted to the machine.

To these ends my invention consists of a bicycle crank, which will be hereinafter described and claimed.

Reference is to be had to the accompanying drawings forming a part of this specification, in which similar figures of reference indicate corresponding parts in both the views.

Figure 1:
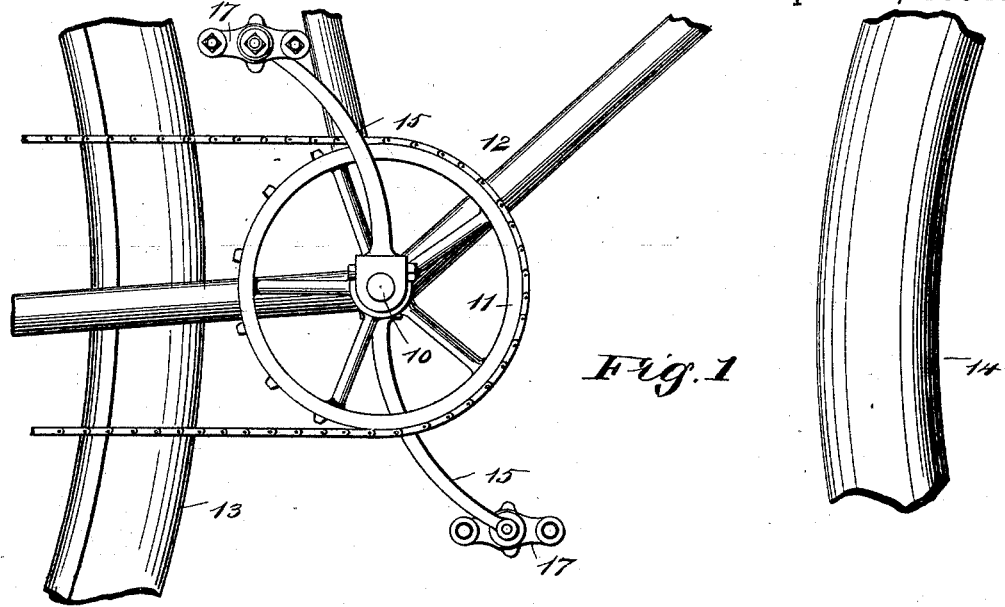
Figure 2:
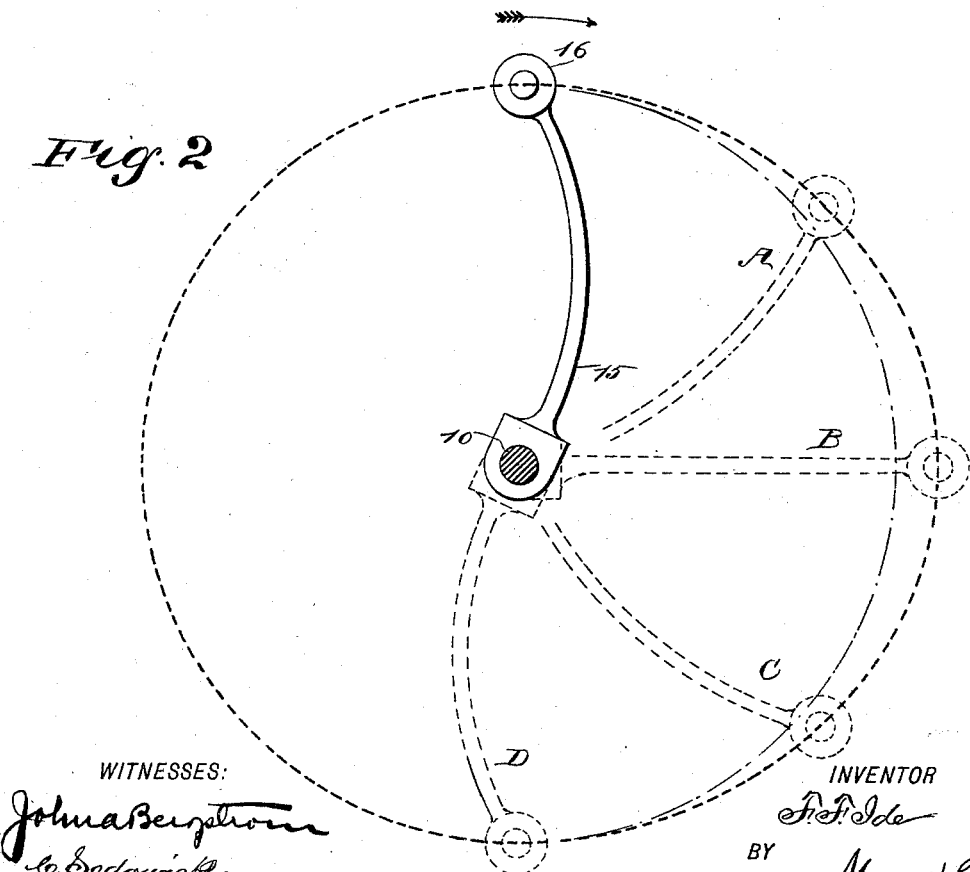

Figure 1 is a broken side elevation of a bicycle provided with my improved cranks; and Fig. 2 is a diagrammatic view, illustrating the movement of the crank under varying pressure.

The machine, as illustrated, is provided with the usual pedal shaft 10, having the customary sprocket wheel 11 and mounted in the ordinary form of frame 12, the rear and front wheels 13, 14, being shown in part to illustrate the relative positions of the cranks and pedals to the rest of the machine. The crank 15 may be made sufficiently stiff for it to hold its normal shape, when the machine is running easily, but in case more power is required and a heavier pressure is applied to the pedal the crank, as it turns in the direction of the arrow in Fig. 2, will begin to straighten somewhat, as shown at A in the drawings, will straighten out entirely under a greater pressure, as shown at B in the drawings, will begin to resume its normal shape as the pressure is removed, as shown at C, and will finally come back to normal position when beneath the shaft, as shown at D. It will thus be seen that the pedal will describe an ellipse, as shown by the heavy broken lines in Fig. 2, the increasing length of the crank giving the increased leverage, so that the shaft may be easily turned. It will be observed too that power required to straighten the spring of the crank will be, in a measure, stored and that this power will be given out as the crank springs back to place while beneath the foot of the rider.

Having thus described my invention, I claim as new and desire to secure by Letters Patent—

1. As an improved article of manufacture, a curved bicycle crank made of spring material, substantially as described.

2. The combination, with the pedal shaft of a bicycle, of a curved crank secured thereto and adapted to straighten under pressure, substantially as described.

FERDINAND F. IDE.

Witnesses:
W. W. HAMMOND,
STEPHEN R. RAY.